United States Patent
Niwa

(10) Patent No.: US 6,853,977 B1
(45) Date of Patent: Feb. 8, 2005

(54) ELECTRONIC SETTLEMENT SYSTEM USING SEPARATE COMMUNICATION CHANNELS FOR SETTLEMENT BETWEEN SALES AND PAYEE TERMINALS

(75) Inventor: Yushi Niwa, Tokyo (JP)

(73) Assignee: NEC Corporation, Tokyo (JP)

( * ) Notice: Subject to any disclaimer, the term of this patent is extended or adjusted under 35 U.S.C. 154(b) by 343 days.

(21) Appl. No.: 09/722,739

(22) Filed: Nov. 28, 2000

(30) Foreign Application Priority Data

Mar. 12, 1999 (JP) .......................................... 11-344070

(51) Int. Cl.[7] .............................................. G06F 17/60
(52) U.S. Cl. ....................................................... 705/21
(58) Field of Search .................................... 705/16, 21

(56) References Cited

U.S. PATENT DOCUMENTS

| | | | |
|---|---|---|---|
| 4,482,802 A | 11/1984 | Aizawa et al. ............... 235/379 |
| 5,640,002 A | * 6/1997 | Ruppert et al. ........ 235/462.46 |
| 5,724,424 A | 3/1998 | Gifford |
| 5,754,655 A | 5/1998 | Hughes et al. ................. 380/24 |
| 5,796,832 A | 8/1998 | Kawan ......................... 380/24 |
| 5,852,773 A | 12/1998 | Hu .............................. 455/403 |
| 5,857,020 A | * 1/1999 | Peterson, Jr. ................. 705/52 |
| 5,923,735 A | * 7/1999 | Swartz et al. ............ 379/93.12 |
| 5,991,738 A | 11/1999 | Ogram |
| 6,065,120 A | * 5/2000 | Laursen et al. .............. 713/201 |
| 6,108,790 A | 8/2000 | Moriya et al. |
| 6,332,133 B1 | 12/2001 | Takayama |
| 6,424,845 B1 | * 7/2002 | Emmoft et al. ........... 455/575.1 |
| 6,523,011 B1 | * 2/2003 | Mihatsch ...................... 705/70 |
| 6,609,113 B1 | * 8/2003 | O'Leary et al. ............... 705/39 |

FOREIGN PATENT DOCUMENTS

| | | |
|---|---|---|
| EP | 0779587 A2 | 9/1996 |
| EP | 0780802 A2 | 12/1996 |
| EP | 0910028 A1 | 11/1997 |
| JP | 8-272742 | 10/1996 |
| JP | 8-329352 | 12/1996 |
| JP | 9-54808 | 2/1997 |
| JP | 10-190890 | 7/1998 |
| JP | 10-198739 | 7/1998 |
| JP | 11-45366 | 2/1999 |
| JP | 11-66430 | 3/1999 |
| JP | 1185117 | * 6/1999 |
| JP | 11-175477 | 7/1999 |
| WO | WO 96/32700 | 10/1996 |
| WO | WO 98/37524 | 12/1998 |

OTHER PUBLICATIONS

White, Ron, How Computers Work, Millennium Ed. Que Corporation, Sep. 1999.*
Derfler, Frank J. et. al. How Networks Work, Millennium Ed., Que Corporation, Jan. 2000.*
Gralla, Preston, How the Internet Works, Millennium Ed., Que Corporation, Aug. 1999.*
Market Research's Point of Sale Terminals, Table of Contents, Jun. 1, 2002, retrieved from Marketresearch.com.*

* cited by examiner

Primary Examiner—Andrew J. Fischer
(74) Attorney, Agent, or Firm—Foley & Lardner LLP

(57) ABSTRACT

In an electronic settlement system, a local link is established between a sales terminal and a payee terminal. The sales terminal transmits settlement information including payment data to the payee terminal, and establishes a first communication channel to a settlement center in response to receipt of a payee-terminal identifier identifying the payee terminal and transmits a first signal containing the settlement information and the identifier to the settlement center. The payee terminal transmits the payee-terminal identifier to the sales terminal when a password is entered thereto after the payee terminal has received the settlement information, establishes a second communication channel to the settlement center and transmits the password and a second signal containing the settlement information and the payee-terminal identifier to the settlement center. The settlement center performs a settlement process if the password is a registered password and the first and second signals are identical to each other.

19 Claims, 13 Drawing Sheets

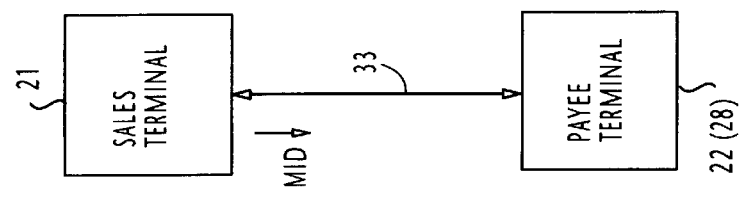
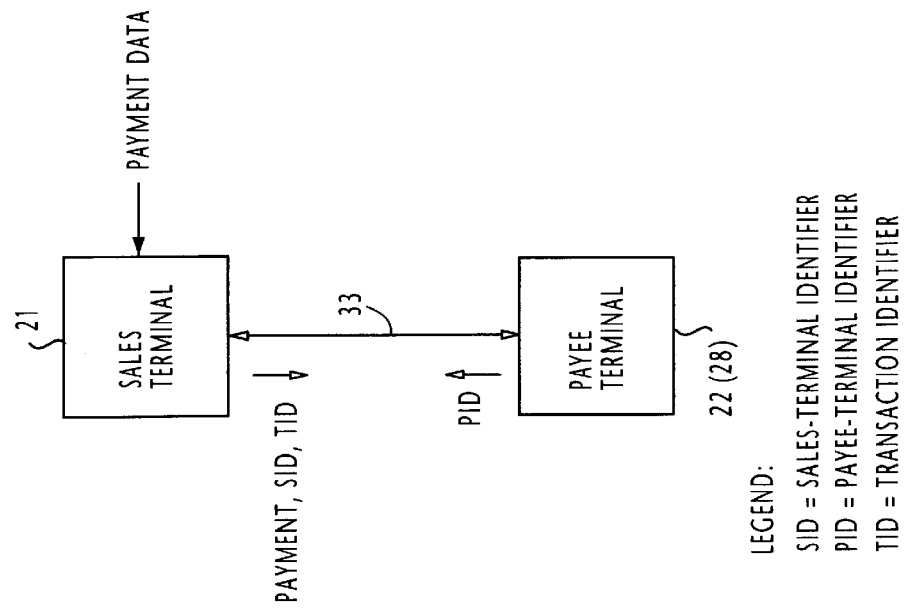

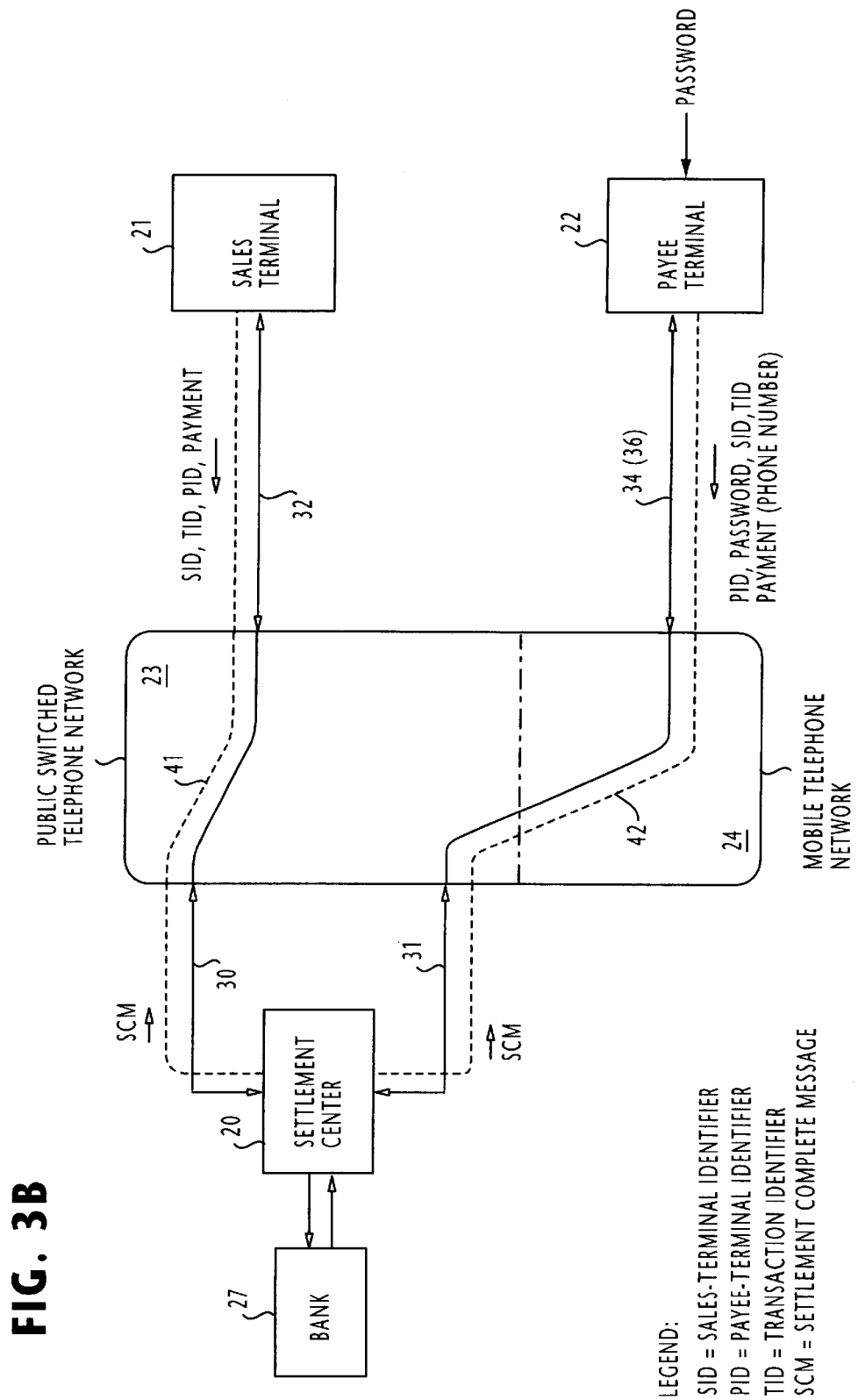

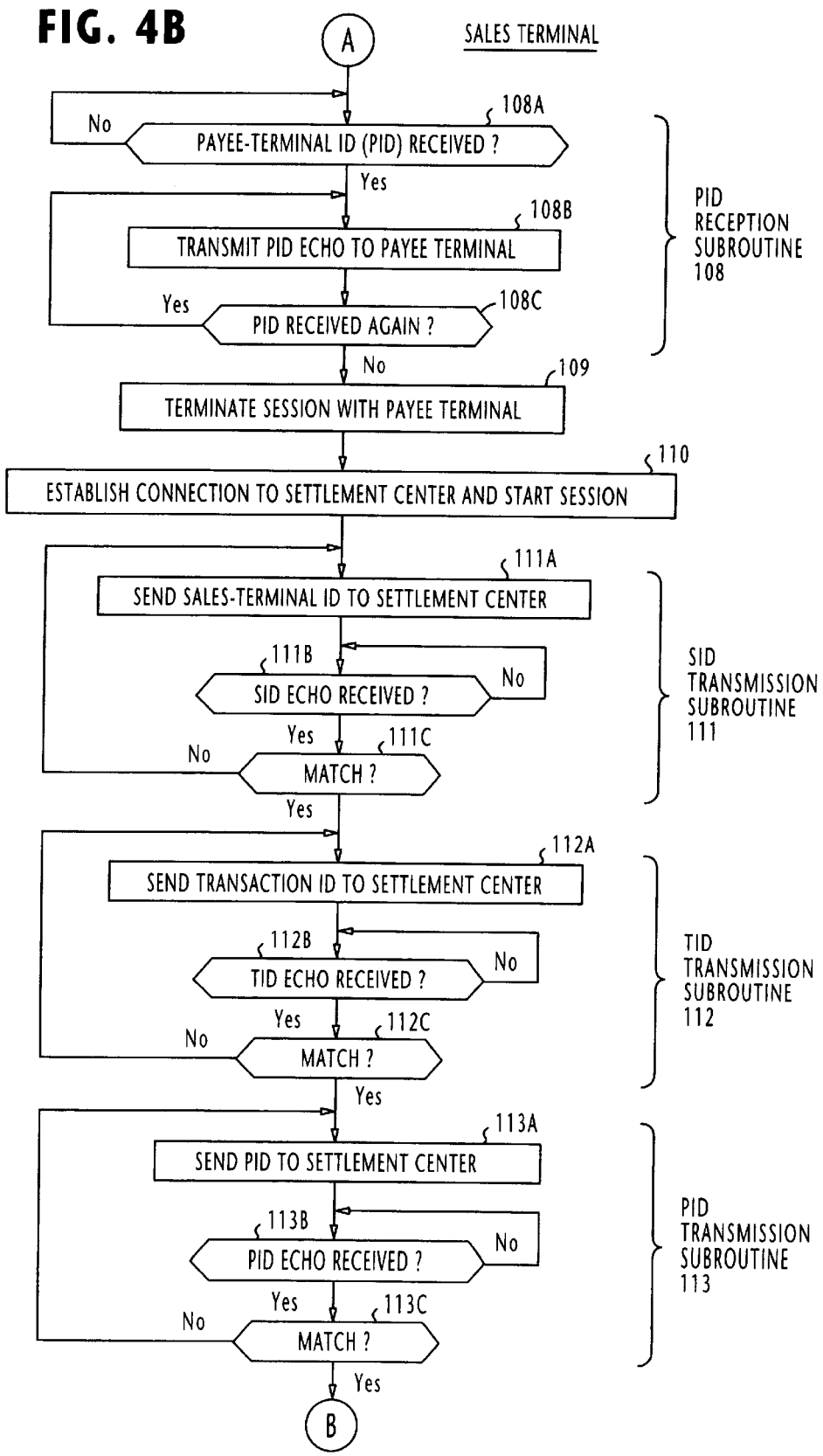

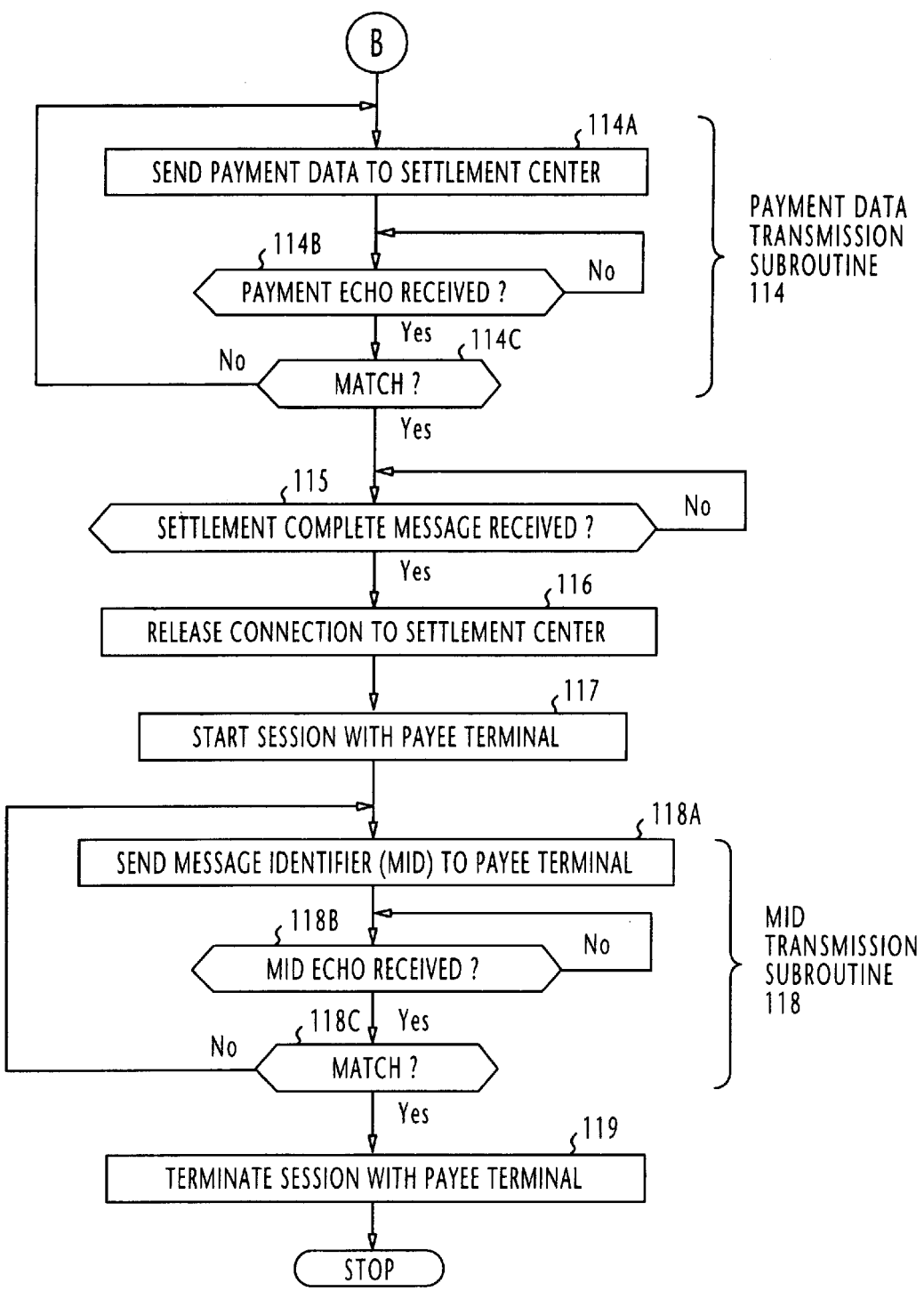

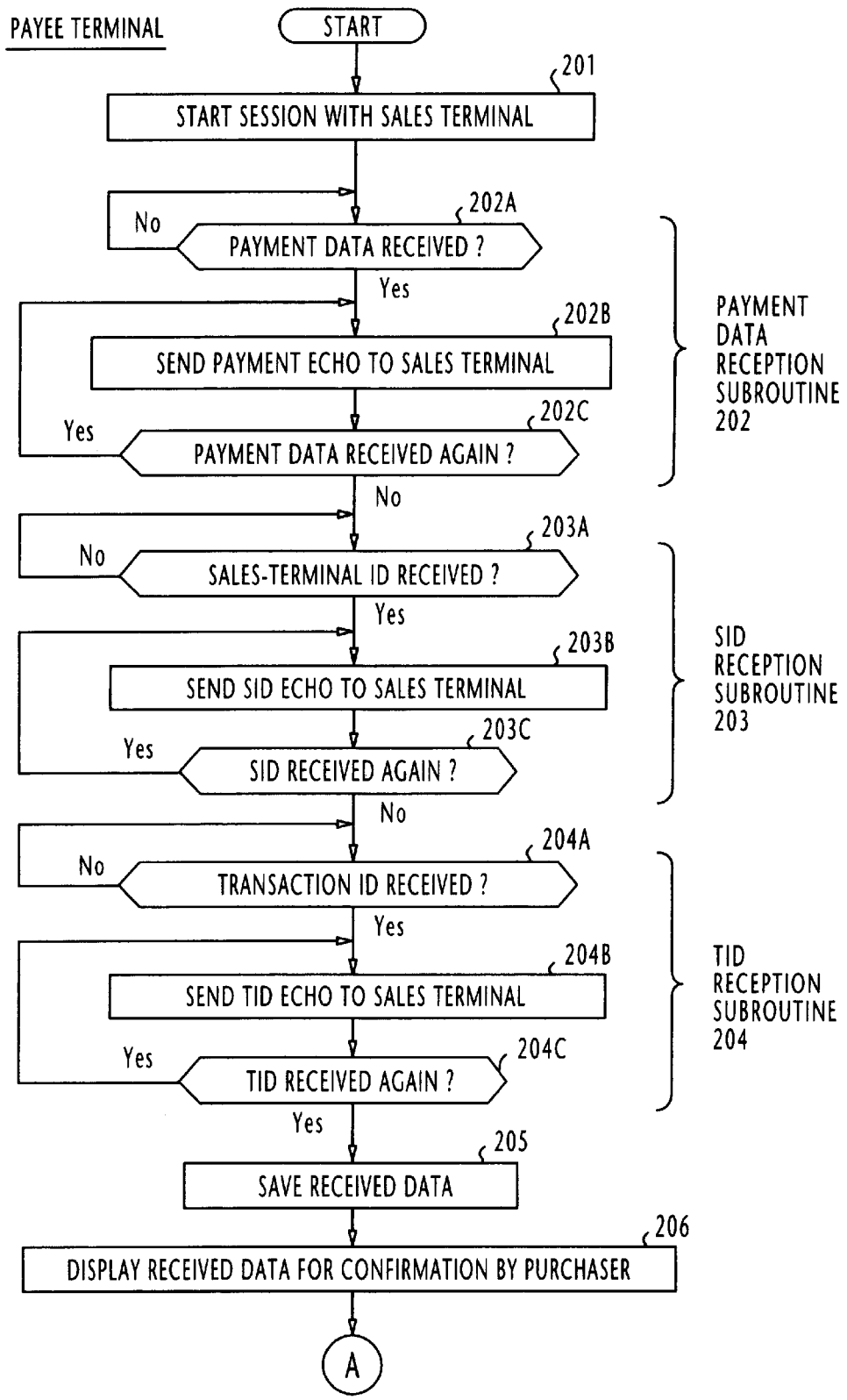

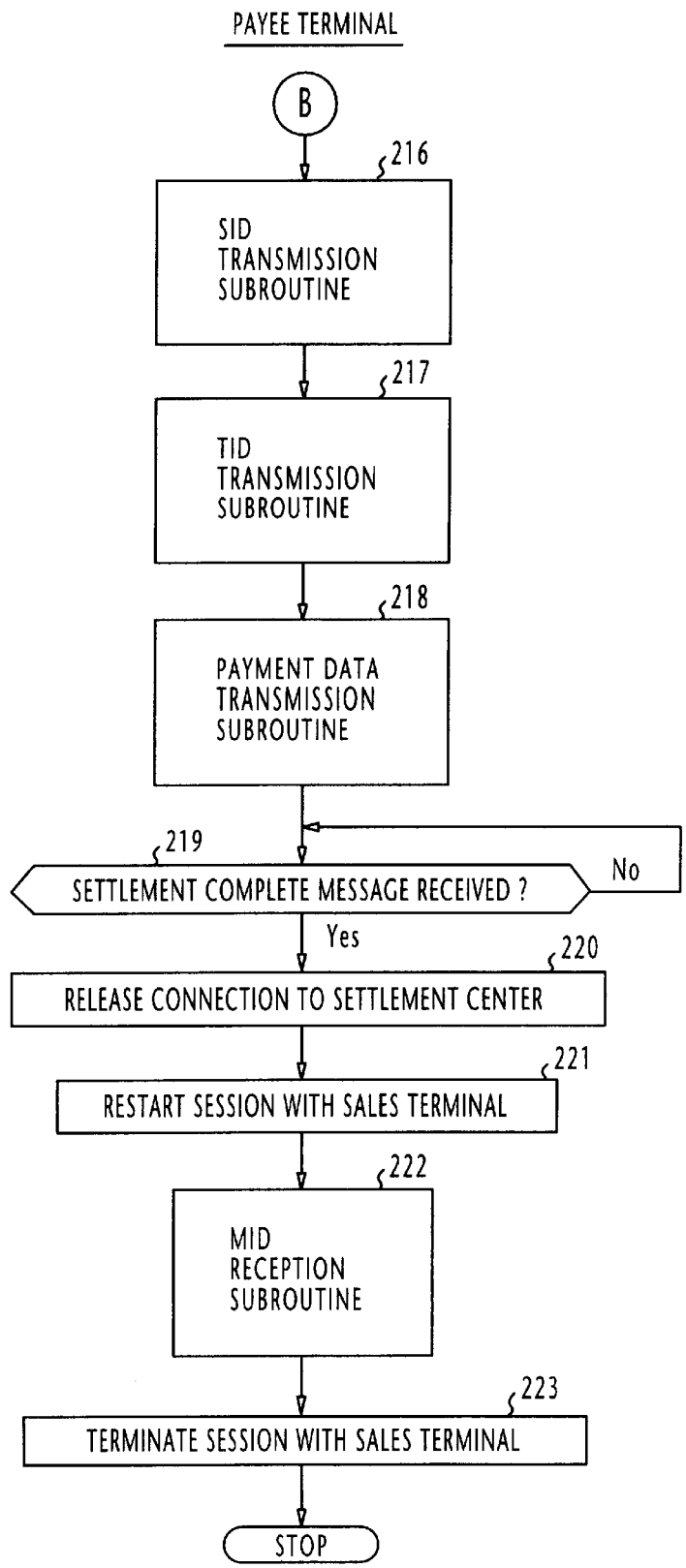

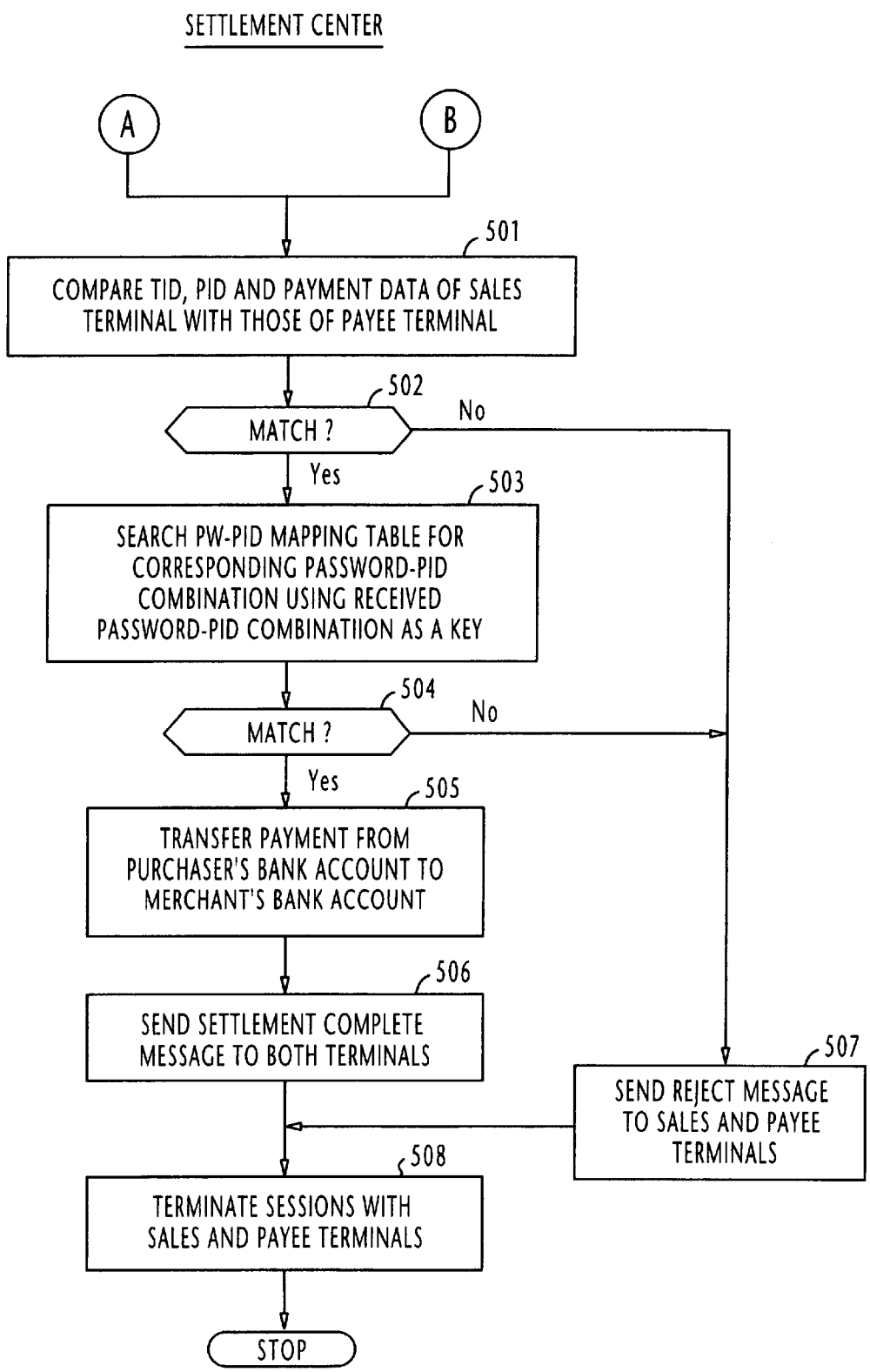

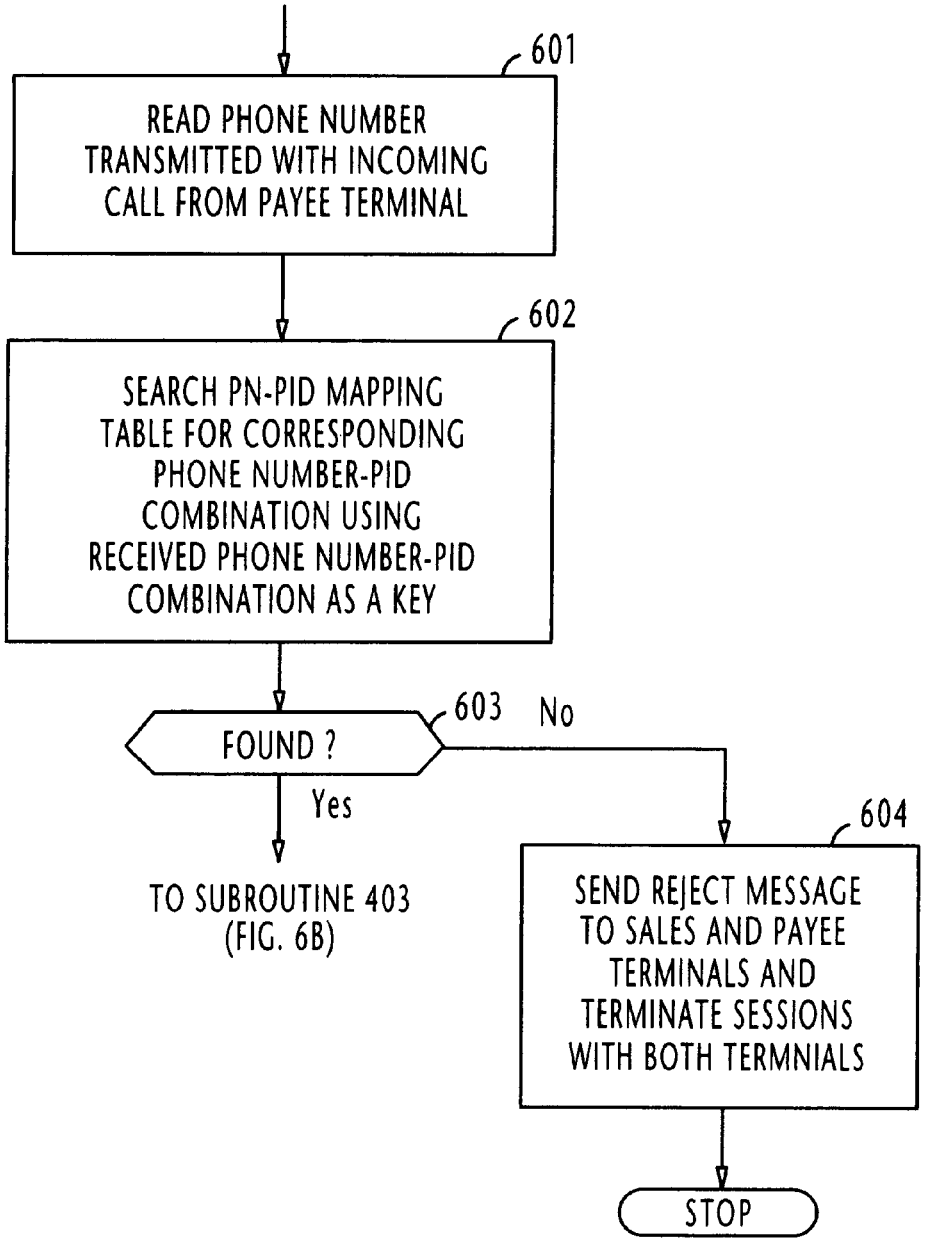

ELECTRONIC SETTLEMENT SYSTEM USING SEPARATE COMMUNICATION CHANNELS FOR SETTLEMENT BETWEEN SALES AND PAYEE TERMINALS

BACKGROUND OF THE INVENTION

1. Field of the Invention

The present invention relates to an electronic settlement system. The present invention is particularly concerned with a technique for ensuring high level of security against possible illegal attempts.

2. Description of the Related Art

Recent commercial transactions use not only cashless transactions such as credit cards but electronic transactions by transmission of settlement data for making the payment for a commercial product or service rendered to consumers. In a card settlement system or in an electronic settlement system, a merchant shop is provided with a computer terminal supplied from the settlement company. When a customer makes a purchase in the merchant shop, the personal information of the customer necessary for his verification is transmitted from the computer terminal to the settlement center of the company. The settlement center examines the received verification information and checks to see if the customer can make the payment of the purchased item and sends the result of the check to the computer terminal of the merchant shop. In the card settlement system, the customer hands over his credit card containing his personal verification information to a merchant. He needs to permit his personal information to be read into the merchant's computer, thus causing it to be laid open to the knowledge of the merchant. In the electronic settlement system, the customer needs to inform the merchant of his personal information. These systems work when the relationship between the customer and the merchant is based on mutual trust. Therefore, the security level of these systems is not satisfactory.

Many attempts have been made to improve the security level of such systems. For example, Japanese Patent Publication 11-45366 titled "individual confirmation system" discloses an authentication system in which customers carry a mobile communication terminal to allow his personal information to be directly accessed from a settlement center. This electronic settlement system includes a settlement center owned and operated by a settlement company to provide management of information necessary for a settlement process to proceed between subscribed customers and merchants. The system further includes a sales terminal in a merchant shop for authentication of customers' personal information. The phone number of the mobile communication terminal is stored in a memory. Settlement center 10 stores customers' phone numbers and passwords of mobile terminals and establishes communication to each mobile communication terminal via a wireless communication channel. In addition, the settlement center and a sales terminal exchanges information necessary for authentication through a wire-line communication channel. When a customer makes a purchase in a merchant shop, this electronic settlement system informs the sales terminal at the merchant shop of the customer's phone number. This is achieved by connecting the mobile communication terminal to the sales terminal and reading the stored phone number. The phone number is then transmitted to the settlement center via a wire-line communication channel. The settlement center establishes a dial-up connection to the mobile communication terminal to urge the customer to enter a password to the mobile communication terminal. On receiving the password 16, the settlement center 10 compares it against a library of passwords that are mapped to the phone numbers of subscribed customers for coincidence and informs the sales terminal of the result of the check. According to the check result, if the sales terminal verifies that the purchaser is the genuine owner of the mobile communication terminal, it urges the purchaser to effect the payment of the purchase. When the payment is made, payment data is transmitted to the settlement center. In this way, the password of a purchaser is transmitted to the settlement center without leaving the password open to the knowledge of the merchant. The level of security can be enhanced in this way.

However, the security level of the prior art electronic settlement system as disclosed in the aforesaid Japanese Patent Publication is still not sufficiently high since the customer's property will be engendered if the purchaser's personal information is illegally used by a merchant.

First, the need to read the phone number of a purchaser into a merchant's sales terminal would tempt a malicious merchant to make a willful false purchase by illegally using the stored phone number as if the purchase has been made by the owner of the phone number. Settlement does not occur in so far as the purchaser has not entered his own password into his mobile communication terminal. However, if such a false purchase occurs during the time the owner of the phone number is conducting a transaction with a different merchant, the settlement center would proceed with the settlement of the false purchase.

Second, since payment data to be sent to the settlement center is supplied only from a merchant's sales terminal and since this data input occurs after the purchaser is authenticated, the merchant has a chance to revise the payment data. In addition, a malicious merchant would behave in the presence of the purchaser as if settlement were lawfully processed and then after the purchaser has left the merchant shop, the merchant has a chance to revise the payment data.

Third, since it is necessary for the merchant to access the purchaser's mobile communication terminal to request the purchaser to enter his own password before proceeding with settlement as described above, the purchaser's phone number must be open to the merchant. Because of this openness and the fact that the time a settlement has been completed is not precisely clear, a malicious merchant would be tempted to make a false phone call to the purchaser by addressing himself as a settlement center personnel and illegally obtains his password.

In addition, the electronic settlement system as disclosed in Japanese Patent Publication 9-54808 requires that purchaser's personal data be processed by special software for electronic signature and cryptic communication. The amount of data will increase due to the redundant bits necessary for ciphering the important information. In particular, a mobile communication terminal in the Wireless Application Protocol (WAP) system requires a browser function necessary to display contents described in a particular information description language in order to acquire information from an internet server. Further, the size of mobile communication terminals must be small and have less weight as possible. Accordingly, there is a need for an electronic settlement system which is not required to use complex software while ensuring high level of security.

SUMMARY OF THE INVENTION

It is therefore an object of the present invention'to provide a settlement system and method that ensures high level of security for important personal information.

According to a first aspect, the present invention provides an electronic settlement system comprising a sales terminal, a payee terminal for establishing a local link to the sales terminal, and a settlement center. The sales terminal transmits settlement information including payment data to the payee terminal via the local link, and establishes a first communication channel to the settlement center in response to receipt of an identifier identifying the payee terminal and transmitting a first signal containing the settlement information and the identifier to the settlement center. The payee terminal transmits its own identifier to the sales terminal via the local link when a password is entered to the payee terminal after the payee terminal has received the settlement information, establishes a second communication channel to the settlement center and transmits the password and a second signal containing the settlement information and the identifier to the settlement center. The settlement center performs a settlement process if the password is a registered password and the first and second signals are identical to each other.

Preferably, the payee terminal is a wireless personal communication device for establishing the second communication channel via a mobile communication network.

According to a second aspect, the present invention provides a settlement method for a system comprised of a sales terminal, a payee terminal and a settlement center. The method comprises the steps of (a) establishing a local link between the sales terminal and the payee terminal, (b) transmitting settlement information including payment data from the sales terminal to the payee terminal via the local link, (c) transmitting an identifier identifying the payee terminal from the payee terminal to the sales terminal via the local link when a password is entered to the payee terminal after the payee terminal has received the settlement information, (d) establishing a first communication channel from the sales terminal to the settlement center in response to receipt of the identifier and transmitting a first signal containing the settlement information and the identifier to the settlement center, (e) establishing a second communication channel from the payee terminal to the settlement center in response to entry of the password and transmitting the password and a second signal containing the settlement information and the identifier to the settlement center, and (f) receiving, at the settlement center, the first signal from the sales terminal and the password and the second signal from the payee terminal, and performing a settlement process if the password is a registered password and the first and second signals are identical to each other.

BRIEF DESCRIPTION OF THE DRAWINGS

The present invention will be described in further detail with reference to the accompanying drawings, in which:

FIGS. 3A, 3B and 3C are schematic diagrams for illustrating successive communication modes of the operation of the electronic settlement system of the present invention;

FIGS. 4A, 4B and 4C are flowcharts of the operation of the sales terminal of the present invention;

FIGS. 5A, 5B and 5C are flowcharts of the operation of the payee terminal of the present invention;

FIGS. 6A, 6B and 6C are flowcharts of the operation of the settlement center of the present invention; and FIG. 7 is a flowchart of a modified mode of operation of the settlement center.

DETAILED DESCRIPTION

Figure 1:
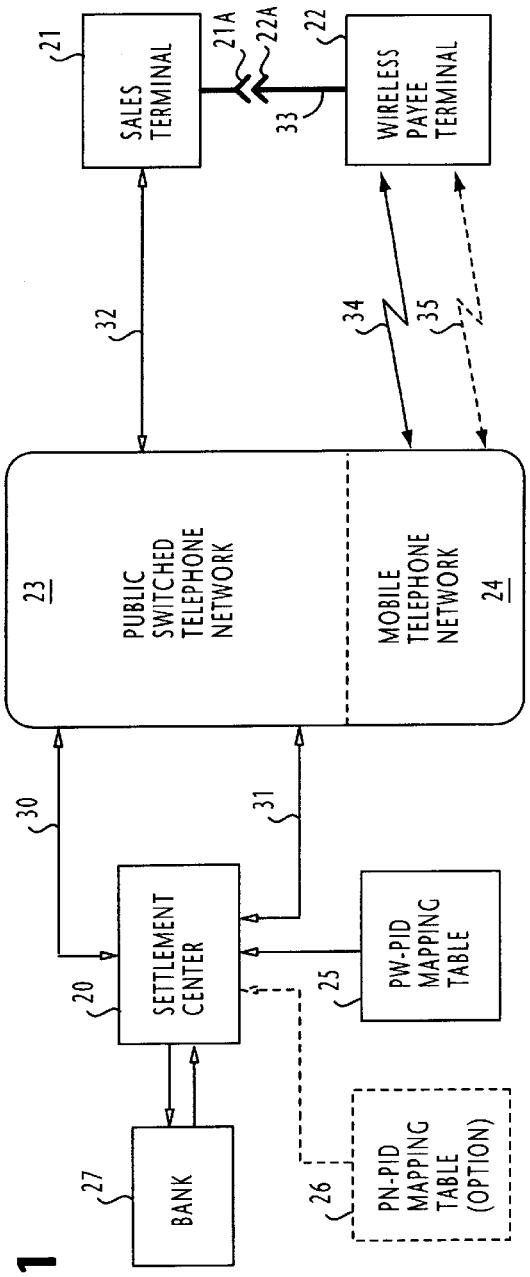
FIG. 1 is a block diagram of an electronic settlement system according to one embodiment of the present invention.

Referring now to FIG. 1, there is shown an electronic settlement system according to the present invention. The system is comprised of a settlement center 20, a sales terminal 21 having a female connector 21A, and a wireless payee terminal 22 such as a mobile telephone, preferably a digital cellular mobile telephone. Settlement center 20 is connected to a public switched telephone network 23 and the sales terminal 21 is connected to the network 23 via a subscriber line 32. Payee terminal 22 is a subscriber station of a mobile telephone network 24 which forms a combined communications network with the PSTN 23.

Wireless payee terminal 22 is provided with a male connector 22A which is detachably coupled with the female connector 21A of sales terminal 21 to establish a two-way communication channel 33. Alternatively, a beam of radiation such as infrared light is used as the communication channel 33. In such instances, the wireless payee terminal 22 is provided with an infrared-light emitter and the sales terminal 21 is provided with an infrared light detector. During use, the payee terminal 22 may be positioned in a holder to project its infrared light beam onto the infrared light detector on the sales terminal 21.

Wireless payee terminal 22 is preferably provided with two wireless units. The first unit is used for establishing a wireless channel 34 on a first frequency to the mobile telephone network 24 and the other unit is used for establishing an alternate wireless channel 35 on a second frequency in the event that the first unit fails to establish the channel 34 within a prescribed time interval possibly due to lack of network resource on the first frequency.

Settlement center 20 is a computer terminal which is connected via subscriber lines 30 and 31 to the switched telephone network 23 and provided with a mapping table 25 in which a plurality of passwords are mapped to a plurality of payee-terminal identifiers (PIDs). As an option, a plurality of phone numbers are mapped to a plurality of PIDs in a mapping table 26 to increase the security level of the electronic settlement system. Settlement center 20 is also connected to a commercial bank 27 for performing a settlement process between purchasers' bank accounts and the merchant's bank account.

Figure 2:
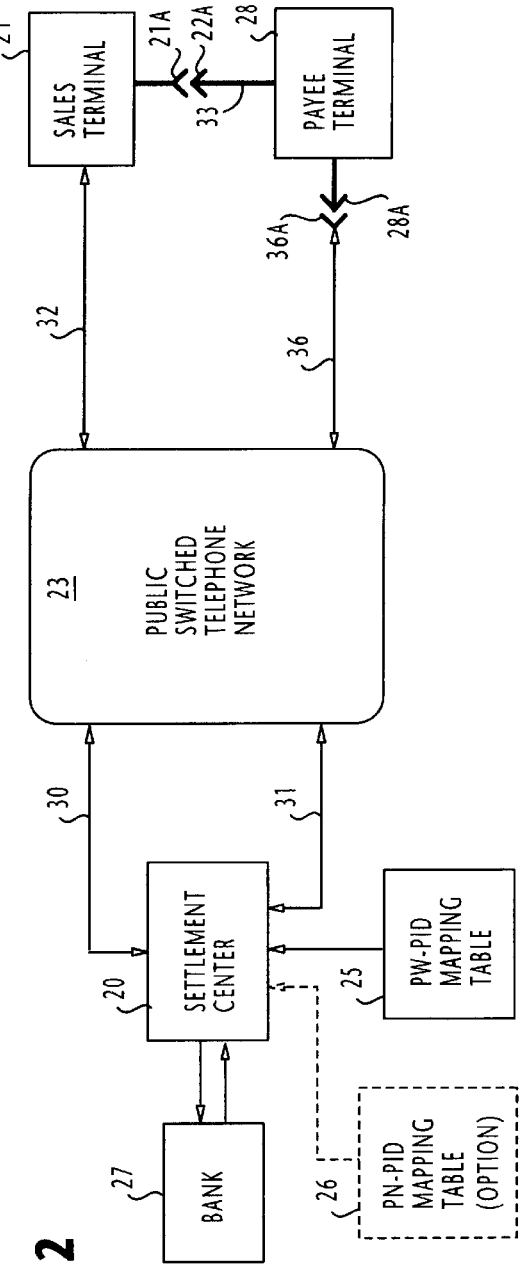
FIG. 2 is a block diagram of an electronic settlement system according to a modified embodiment of the present invention.

Although the payee terminal is preferably a wireless terminal, a hand-held personal communication device such as a personal digital assistant (PDA) can also be used as a payee terminal as shown in FIG. 2. In this case, the payee terminal 28 has an additional male connector 28A which engages a female connector 36A of a subscriber line 36 which terminates at a subscriber line port of the PSTN 23. Further, the payee terminal 28 has a dialing function for setting up a call to the PSTN 23.

The sales and payee terminals operate in three successive modes as illustrated in FIGS. 3A, 3B and 3C, respectively.

In the first mode (FIG. 3A), the sales terminal 21 sends information including payment data, sales-terminal identifier (SID) and a transaction identifier (TID to the payment terminal through the communication channel 33 and the payee terminal sends its payee-terminal identifier (PID) to the sales terminal 21, so that these terminals share the same items of information necessary for the settlement center 20 to verify the payee terminal 22.

In the second mode (FIG. 3B), the sales and payee terminals establish individual communication channels 41 and 42 via networks 23 and 24 to the settlement center 20 for transmitting the shared information from the sales terminal 21 and the shared information plus a password from the payee terminal 22. As an option, the payee terminal transmits its phone number to the settlement center 20 for further increasing the level of security. When the payee terminal 22 is authenticated, the settlement center 20 transfers payment from the purchaser's bank account to the merchant's bank account and sends back a settlement complete message (SCM) to both terminals indicating that a settlement transaction is successfully completed.

In the third mode (FIG. 3C), the sales terminal 21 informs the payee terminal 22 through the communication channel 33 of the fact that it has received a settlement complete message from the center for asking the payee terminal if it has also received the same message from the settlement center 20. This is achieved by sending a message identifier (MID) from the sales terminal to the payee terminal.

When a customer makes a purchase in a merchant's sales site and approaches the sales terminal 21. The customer connects a payee terminal 22 (or 28) to the sales terminal 21 to establish the communication link 33. A sales person enters the payment value to be paid by the purchaser into the sales terminal 21.

Figure 4A:
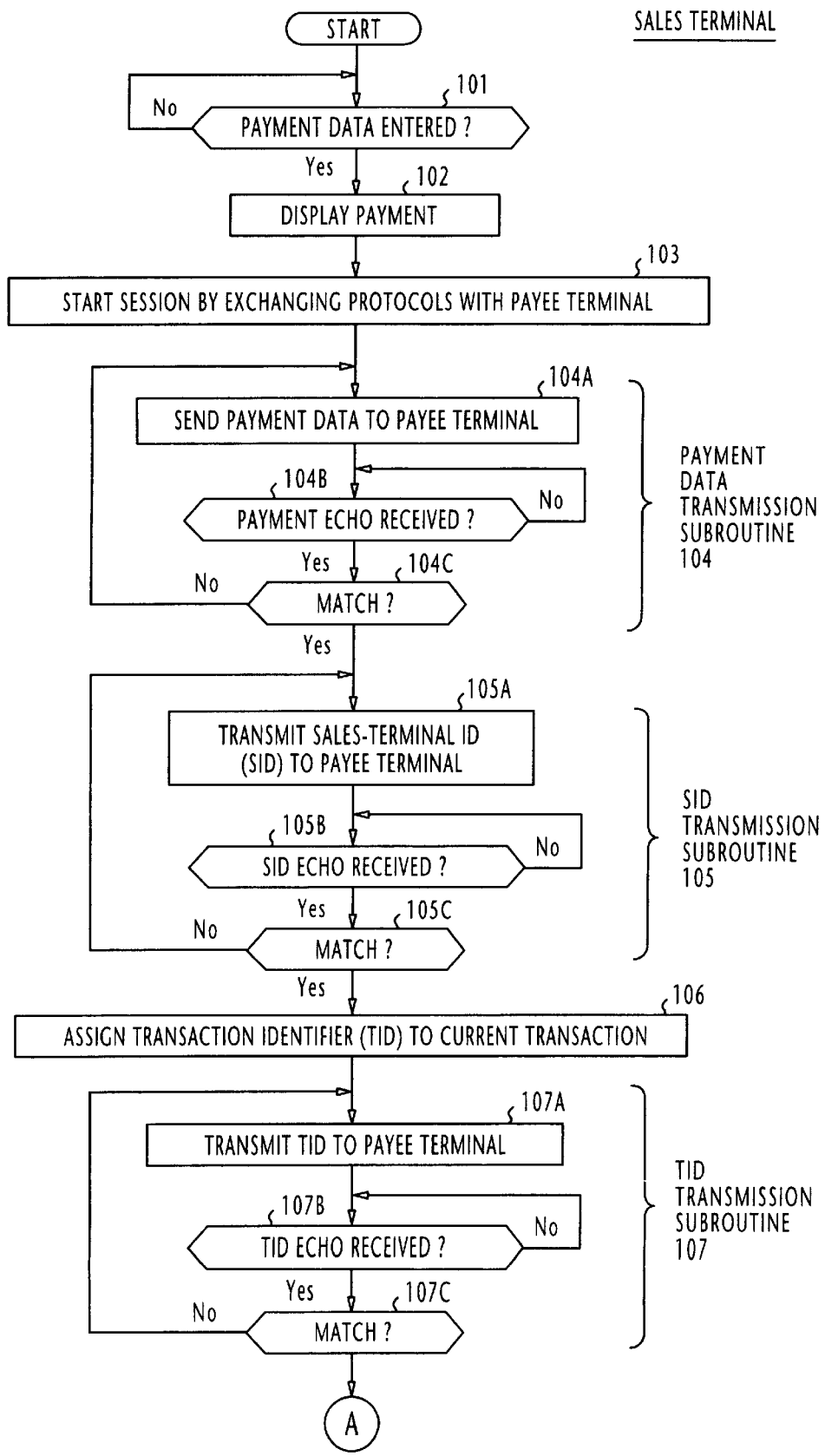

The operation of the sales terminal 21 proceeds according to the flowcharts of FIGS. 4A, 4B and 4C.

In FIG. 4A, the routine begins with the entry of the payment data at step 101. The entered payment data is displayed on the sales terminal 21 (step 102) and the sales terminal 21 starts a session with the payee terminal 22 or 28 by exchanging protocols (step 103). In this process, sales terminal 21 may inform the payee terminal of the phone number of settlement center 20. Sales terminal 21 starts sending a series of settlement data to the payee terminal over the communication link 33, including the payment data, the sales-terminal identifier (SID) of the sales terminal 21, and a transaction identifier (TID) identifying the current transaction, and then receives the payee-terminal identifier (PID) of the payee terminal. Each data transmission subroutine, transmission of data requires the transmitting terminal to hold a copy of the transmitted data and the receiving terminal to return a copy of the received data, or "echo" to the transmitting terminal to enable it to determine the equality of the received echo to the copy of the transmitted data. If they are equal, the transmitting terminal recognizes that the transmitted data is properly received by the receiving terminal.

Following the execution of step 103, the sales terminal 21 successively performs data transmission subroutines 104, 105 and 107 for the transmission of payment data, SID and TID to the payee terminal.

Specifically, during subroutine 104 the sales terminal 21 sends the payment data to the payee terminal (step 104A), receives a payment echo (step 104B) and checks for equality to the payment data (step 104C). If they are not equal to each other, flow returns from step 104C to step 104A to retransmit the payment data. During subroutine 105 the sales terminal 21 transmits its sales-terminal identifier (SID) to the payment terminal (step 105A), and receives an SID echo (step 105B) and tests for its equality to the SID (step 105C). If the SID is successfully transmitted, the sales terminal 21 assigns a transaction identifier (TID) to the current transaction (step 106) and starts TID transmission subroutine 107 in which it transmits the TID to the payment terminal (step 107A), receives a TID echo (step 107B) and tests for its equality to the TID (step 106C).

If the TID is successfully transmitted, the sales terminal 21 performs reception subroutine 108 (see FIG. 4B) in which it receives a payee-terminal identifier (PID) from the payee terminal (step 108A), sends a PID echo back to the payee terminal 108B and awaits a prescribed time interval to determine if a PID is received again within that time interval (step 108C). If the sales terminal 21 receives a PID again, it determines that there is a mismatch between the previous PID and its echo, and returns to step 108B to retransmit a PID echo to the payee terminal. Steps 108B and 108C will be repeated until the sales terminal determines that it no longer receives a PID after transmission of a PID echo.

When both sales and payee terminals and have shared the same PID information, the decision at step 108C is negative and the sales terminal proceeds to step 109 to terminate the session with the payee terminal.

At step 110, the sales terminal establishes a connection to the settlement center 20 via the PSTN 23 and starts a session by exchanging protocols with the center. In this session, the sales terminal successively performs data transmission subroutines 111, 112, 113 (FIG. 4B) and 114 (FIG. 4C) for the transmission of SID, TID, PID and payment data to the settlement center 20.

Specifically, during SID transmission subroutine 111 the sales terminal sends its sales-terminal identifier (step 11A), receives an SID echo from the settlement center (step 111B) and checks for a match between the SID and the received echo (step 111C). If the SID is successfully transmitted, TID transmission subroutine 112 is executed in which the transaction identifier is sent to the center (step 112A) and a TID echo is received from the center (step 112B) and checked for a match with the TID (step 112C). After successful transmission of the TID, PID transmission subroutine 113 is executed in which the payee-terminal identifier is sent to the center (step 113A) and a PID echo is received therefrom (step 113B) and checked for coincidence with the PID (step 113C). During data transmission subroutine 114 (see FIG. 4C), the sales terminal transmits the payment data to the center (step 114A) and receives a PID echo (step 114B) and checks for coincidence with the payment data (step 114C).

Settlement center 20 will receive a password from the payee terminal plus the same items of information as those received from the sales terminal 21 and verifies the received data for authenticating the payee terminal. If the received data are verified, the settlement center 20 proceeds to settle the payment and sends a settlement complete message to both terminals 21 and 22 (or 28).

At step 115 (FIG. 4C), the sales terminal 21 receives the settlement complete message from the center 20 and release the connection to the center (step 116) and restarts a session with the payee terminal (step 117) to perform transmission subroutine 118.

In subroutine 118, the sales terminal 21 transmits a message identifier (MID) to the payee terminal 22 (step 118A), identifying the settlement complete message, receives an MID echo (step 118B) and checks for equality to the MID (step 118C). If the decision at step 118C is affirmative, the sales terminal determines that the payee terminal has also received the same settlement complete message from the center 20 as those the sales terminal has received from the center and proceeds to step 119 to terminate the session with the payee terminal.

The operation of the payee terminal will be described with reference to the flowcharts of FIGS. 5A, 5B and 5C by assuming that the terminal 22 is a wireless terminal having working and standby units for establishing a wireless link to the mobile telephone network 24.

In FIG. 5A, the payee terminal 22 starts a session with the sales terminal 21 via the communication channel 33 (step 201). The payee terminal starts receiving the payment data, SID and TID information from the sales terminal 21 in successive data reception subroutines 202, 203 and 204.

Specifically, during payment data reception subroutine 202, the payee terminal receives the payment data (step 202A), returns a payment echo to the sales terminal (step 202B) and awaits a prescribed interval to check for the reception of payment data again (step 202C) to repeat the transmission of a payment echo if payment data is received again. During SID reception subroutine 203, the payee terminal receives a sales-terminal identifier (step 203A), returns an SID echo to the sales terminal (step 203B) and awaits a prescribed interval to check for the reception of an SID again (step 203C) to repeat the transmission of an SID echo if an SID is received again. During TID reception subroutine 204, the payee terminal receives a transaction terminal identifier (step 204A), returns a TID echo to the sales terminal (step 204B) and awaits a prescribed interval to check for the reception of a TID again (step 204C) to repeat the transmission of a TID echo if a TID is received again.

Payee terminal 22 then saves all the information received from the sales terminal 21 in memory (step 205) and displays the saved information on a display panel to be confirmed by the purchaser (step 206). When the purchaser confirms that the displayed information is correct, he enters a password to the payee terminal 22.

Figure 5B:
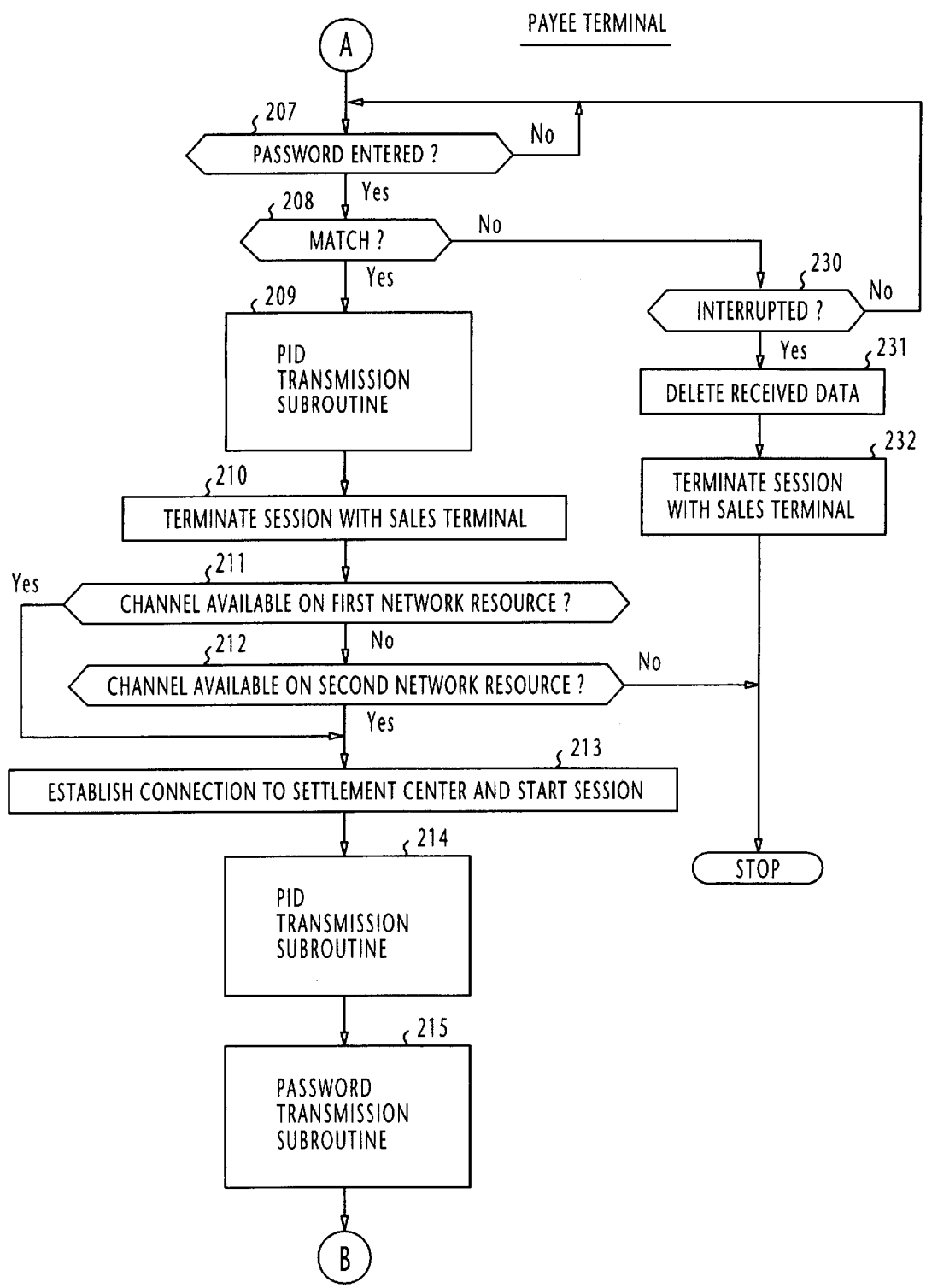

In FIG. 5B, when a password is entered (step 207), the payee terminal checks to see if it matches the one that is stored in the payee terminal. If the entered password is not correct, control branches out to step 230 to determine whether the transaction is to be interrupted. If not, flow returns to step 207 to allow the purchaser to re-enter a password. If the transaction is to be interrupted, the payee terminal proceeds to step 231 to delete the received data and terminates the session to the sales terminal (step 232) and proceeds to the end of the routine.

If the entered password is correct, flow proceeds from decision step 208 to PID transmission subroutine 209 to transmit the payee-terminal identifier to the sales terminal 21 and then terminates the session with the sales terminal (step 210).

At step 211, the payee terminal 22 attempts to establish a wireless link to the mobile network 24 using a first network resource (or frequency) and checks to see if a communication channel is available. If the decision at step 211 is negative, flow proceeds to step 212 to make a second attempt to establish a wireless link to the mobile network 24 using a second frequency and checks to see if a communication channel is available. If the second attempt fails, the payee terminal proceeds to the end of the routine. If either of these attempts is successful, the payee terminal proceeds to step 213 to establish a connection to the settlement center 20 via the mobile network 24 and PSTN 23 and starts a session with the center 20. Payee terminal 22 successively performs transmission subroutines 214, 215, 216, 217 and 218 to transmit the payee-terminal identifier, password, SID, TID and payment data to the center 20 (FIG. 5C).

If the settlement center 20 authenticates the payee terminal, it sends a settlement complete message to both terminals.

When the payee terminal 22 receives this settlement complete message (step 219), it releases the connection to the settlement center (step 221) and restarts a session with the sales terminal 21 (step 221). If the sales terminal has received the same settlement complete message from the center 20, the payee terminal will receive a message identifier (MID) from the sales terminal during MID reception subroutine 222. During this subroutine, the payee terminal sends an MID echo back to the sales terminal to ensure correspondence. At step 223, the payee terminal terminates the session with the sales terminal.

Figure 6A:
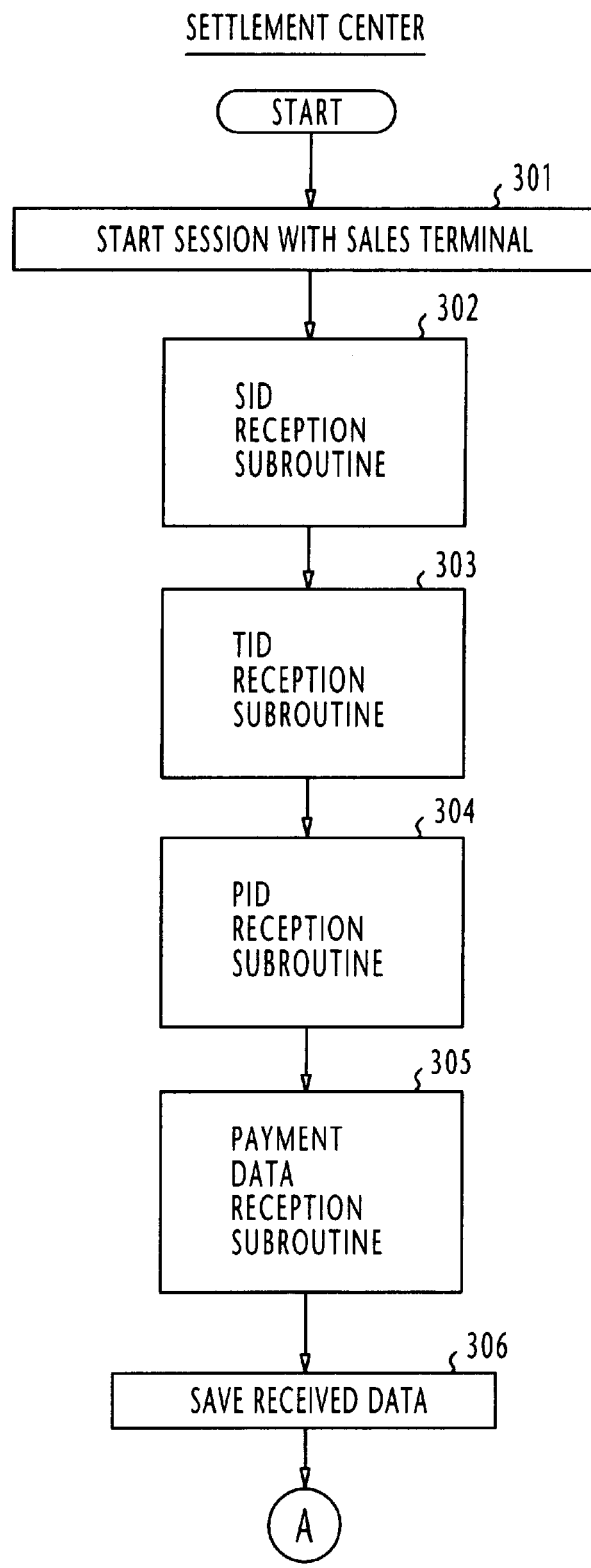
Figure 6B:
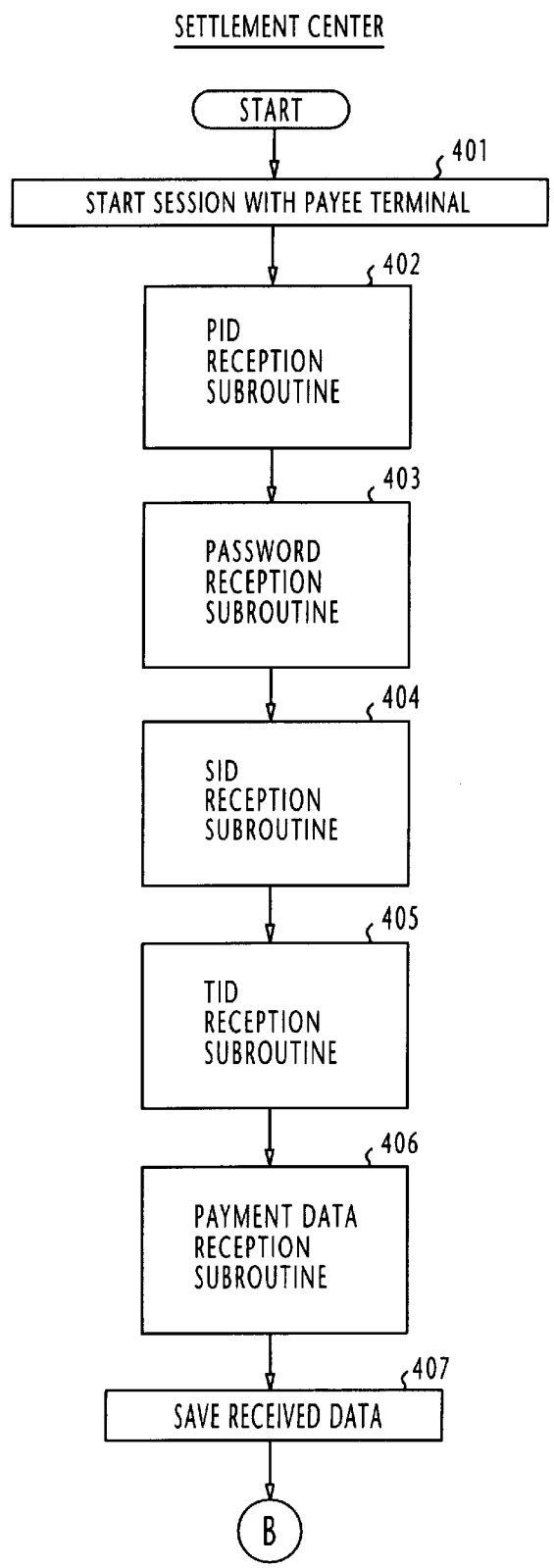

The operation of the settlement center 20 will be described with reference to FIGS. 6A, 6B and 6C.

When the settlement center 20 begins a session with the sales terminal 21 (step 301, FIG. 6A), it successively performs data reception subroutines 302, 303, 304 and 305 for receiving the SID, TID, PID and payment data of the sales terminal and saves the received data in memory (step 306). The Likewise, when the settlement center 20 begins a session with the payee terminal 22 (step 401, FIG. 6B), it successively performs data reception subroutines 402, 403, 404, 405 and 406 for receiving the PID, password, SID, TID and payment data of the payee terminal and saves the received data in memory (step 407).

In FIG. 6C, the settlement center 20 compares the TID, PID and payment data of the sales terminal with those of the payee terminal for coincidence (step 501). If they match (step 502), flow branches to step 503 to make a search through the password-PID mapping table 26 for a password-PID combination that corresponds to the received combination of password and PID. If there is one (step 504), the settlement center authenticates the payee terminal and proceeds to step 505 to settle the payment by transfer from the purchaser's bank account to the merchant's bank account. At step 506, the center 20 transmits a settlement complete message (SCM) to the sales and payee terminals and terminates the sessions with both terminals (step 508). If the decision at step 502 or 504 is negative, flow branches out to step 507 to send a reject message to the sales and payee terminals and terminates the sessions (step 508).

FIG. 7 is a flowchart of a preferred embodiment of the present invention in which the settlement center 20 receives a phone number from the payee terminal at step 601 following PID reception subroutine 402 (FIG. 6B) and makes a search through the PN-PID mapping table 26 for a phone number-PID combination corresponding to the combination of the received phone number and the PID information (step 602). If there is one (step 603), control proceeds to password reception subroutine 403. If the decision is negative at step 603, the settlement center sends a reject message to both terminals and terminates the sessions with them (step 604).

What is claimed is:

1. An electronic settlement system for performing a transaction comprising:

a sales terminal;

a payee terminal for establishing a local link to said sales terminal; and a settlement center, wherein said sales terminal transmits settlement information to the payee terminal via said local link, establishes a first communication channel to the settlement center in response to receipt of an identifier identifying the payee terminal, and transmits a first signal containing the settlement information and said identifier to the settlement center; wherein said payee terminal receives a password entered by a user of the payee terminal, and said payee terminal checks the password to see if it matches a password previously stored in said payee terminal, and only if a match exist, said payee terminal permits additional processing of said transaction;

said payee terminal performing said permitted additional processing by transmitting said identifier to the sales terminal via said local link after the payee terminal has received said settlement information, establishes a second communication channel to the settlement center, and transmits said password and a second signal containing the settlement information and said identifier to the settlement center; and wherein said settlement center performs a settlement process only if
  (1) said password received from said payee terminal matches a password stored at said settlement center in a password-identifier mapping table, said received password also being stored in the payee terminal, and
  (2) the first and second signals are identical to each other.

2. The electronic settlement system of claim 1, wherein said payee terminal is a wireless personal communication device for establishing said second communication channel via a mobile communication network.

3. The electronic settlement system of claim 2, wherein said wireless personal communication device is a digital cellular mobile telephone.

4. The electronic settlement system of claim 2, wherein said wireless personal communication device is configured to establish an alternate communication channel if an attempt to establish said second communication channel fails.

5. The electronic settlement system of claim 1, wherein said settlement center is configured to transmit a message to said sales terminal and said payee terminal when said settlement process is completed, and wherein said settlement terminal is configured to transmit a signal to said payee terminal indicating that the sales terminal has received said message.

6. The electronic settlement system of claim 1, wherein said settlement information includes an identifier identifying the sales terminal and an identifier identifying said transaction between said sales terminal and said payee terminal.

7. The electronic settlement system of claim 1,
  wherein said payee terminal is configured to transmit a phone number to said settlement center, and
  wherein said settlement center includes a mapping table for mapping a plurality of phone numbers and a plurality of identifiers identifying different payee terminals;
  wherein said settlement center is configured to make a search through said mapping table for a phone number mapped to the identifier of said payee terminal and perform said settlement process if the mapped phone number is detected in said mapping table.

8. The electronic settlement system of claim 1, wherein said sales terminal and said payee terminal are configured to exchange an original signal and a replica of the original signal until the original signal and the replica are determined to be equal to each other.

9. The electronic settlement system of claim 1, wherein said settlement center is configured to transmit a replica of an original signal to each of said sales and payee terminals until the original signal and the replica are determined to be equal to each other.

10. A settlement method for a transaction in a system comprised of a sales terminal, a payee terminal and a settlement center, comprising the steps of:

a) establishing a local link between the sales terminal and the payee terminal;

b) transmitting settlement information from the sales terminal to the payee terminal via said local link;

c) entering a password into said payee terminal;

d) in said payee terminal, conforming said password by checking to see if said entered password matches a password previously stored in said payee terminal, and permitting continuation of said transaction only if a match exist;

e) transmitting an identifier identifying the payee terminal from the payee terminal to the sales terminal via said local link when said password has been confirmed after the payee terminal has received said settlement information;

f) establishing a first communication channel from the sales terminal to the settlement center in response to receipt of said identifier and transmitting a first signal containing the settlement information and said identifier to the settlement center;

g) establishing a second communication channel from the payee terminal to the settlement center in response to entry and confirmation of said password and transmitting said password and a second signal containing the settlement information and said identifier to the settlement center; and h) receiving, at said settlement center, said first signal from the sales terminal and said password and said second signal from the payee terminal; and i) performing a settlement process only if
  (1) said password received from said payee terminal matches a password stored at said settlement center in a password-identifier mapping table, said received password also being stored in the payee terminal; and
  (2) the first and second signals are identical to each other.

11. The settlement method of claim 10, wherein said settlement center is configured to transmit a message to said sales terminal and said payee terminal when said settlement process is completed, and wherein said settlement terminal is configured to transmit a signal to said payee terminal indicating that the sales terminal has received said message.

12. The settlement method of claim 10, wherein said settlement information includes an identifier identifying the sales terminal and an identifier identify said transaction between said sales terminal and said payee terminal.

13. The settlement method of claim 10, wherein said settlement center includes a mapping table for mapping a plurality of phone numbers and a plurality of identifiers identifying different payee terminals, wherein step (e) further comprises the step of:
  transmitting a phone number from the payee terminal to said settlement center, and
  wherein step (f) further comprises the step of:
  making a search through said mapping table for a phone number mapped to the identifier of said payee terminal, and
  performing said settlement process if the mapped phone number is detected in said mapping table.

14. The settlement method of claim 10, wherein step (b) comprises receiving a replica of an original signal sent from the sales terminal to the payee terminal and retransmitting a copy of the original signal to the payee terminal until the original signal and the replica are determined to be equal to each other.

15. The settlement method of claim 10, wherein step (c) comprises receiving a replica of said identifier sent from the payee terminal to the sales terminal and retransmitting a copy of the identifier to the sales terminal until the identifier and the replica are determined to be equal to each other.

16. The settlement method of claim 10, wherein step (f) comprises the steps of:

transmitting a replica of said first signal sent from the sales terminal to the settlement center;

retransmitting a copy of the first signal to the sales terminal until the first signal and the replica are determined to be equal to each other;

transmitting a replica of said second signal sent from the payee terminal to the settlement center;

retransmitting a copy of the second signal to the payee terminal until the second signal and the replica are determined to be equal to each other.

17. A payee terminal for processing a transaction in an electronic settlement system, wherein the system includes a sales terminal and a settlement center, wherein the sales terminal transmits settlement information to the payee terminal via a local link, and establishes a first communication channel to the settlement center in response to receipt of an identifier identifying the payee terminal and transmits a first signal containing the settlement information and said identifier to the settlement center, and wherein said settlement center performs a settlement process only if (1) a password received from the payee terminal matches a password stored in said settlement center in a password-identifier mapping table, said received password being also the same as a password stored in the payee terminal and (2) the first signal from said sales terminal is identical to a second signal from said payee terminal, the payee terminal comprising the functions of:

establishing said local link to said sales terminal, entering a password into said payee terminal;

confirming said password by checking the entered password to see if it matches a password previously stored in said payee terminal, and only if a match exist, permitting additional processing of said transaction performing said additional processing by transmitting said identifier to the sales terminal via said local link when said password is confirmed after the payee terminal has received said settlement information from the sales terminal and establishing a second communication channel to the settlement center and transmitting said password and said second signal containing the settlement information and said identifier to the settlement center.

18. A sales terminal for an electronic settlement system wherein the system includes a payee terminal and a settlement center, wherein the payee terminal transmits an identifier identifying the payee terminal when the payee terminal receives settlement information from the sales terminal via a local link; receives a password entered by a user of the payee terminal; confirms said entered password by checking to see if said entered password matches a password previously stored in said payee terminal, and establishes a first communication channel to the settlement center in response to confirmation of said entered password after the payee terminal has received said settlement information and transmits to said settlement center said confirmed password and a signal containing the settlement information and said identifier, and wherein said settlement center performs a settlement process only if (1) said password received from the payee terminal matches a password stored at said settlement center in a password-identifier mapping table, said received password also being stored in the payee terminal and (2) the signal from said payee terminal is identical to a signal from said sales terminal, the sales terminal comprising the functions of:

establishing said local link to said payee terminal, transmitting said settlement information to the payee terminal via said local link, and establishing a second communication channel to the settlement center in response to receipt of said identifier from the payee terminal and transmitting a signal containing the settlement information and said identifier to the settlement center.

19. A settlement center for processing a transaction in an electronic settlement system wherein the system includes a sales terminal and a payee terminal, wherein the sales terminal transmits settlement information to the payee terminal via a local link, and establishes a first communication channel to the settlement center in response to receipt of an identifier identifying the payee terminal and transmits a first signal containing the settlement information and said identifier to the settlement center, and wherein the payee terminal receives a password entered by a user of the payee terminal and confirms said entered password by checking the entered password to see if it matches a password previously stored in said payee terminal, and only if a match exist, said payee terminal permitting additional processing of said transaction; said additional processing including transmitting said identifier when the payee terminal receives said settlement information and establishes a second communication channel to the settlement center in response to confirmation of said password after the payee terminal has received said settlement information from the sales terminal, and transmits said password and a second signal containing the settlement information and said identifier to the settlement center, the settlement center comprising the functions of:

receiving the first signal via said first communication channel and the password and the second signal via said second communication channel;

comparing said first signal to said second signal; and performing a settlement process only if (1) said password matches a password stored at said settlement center in a password-identifier mapping table, said received password also being stored in the payee terminal and (2) the first and second signals are identical to each other.

* * * * *

UNITED STATES PATENT AND TRADEMARK OFFICE
CERTIFICATE OF CORRECTION

PATENT NO.     : 6,853,977 B1
DATED          : February 8, 2005
INVENTOR(S)    : Yushi Niwa It is certified that error appears in the above-identified patent and that said Letters Patent is hereby corrected as shown below:

<u>Title page,</u>
Item [54], Title, should read -- ELECTRONIC SETTLEMENT SYSTEM USING SEPARATE COMMUNICATION CHANNELS FOR SETTLEMENT BETWEEN SALES AND PAYER TERMINALS --.
Item [57], ABSTRACT,
Lines 2, 4, 6, 6-7, 9 (both occurrences), 11 and 14-15, "payee" should be -- Payer --.

<u>Drawings,</u>
Figs 1, 2, 3A, 3B (both occurrences), 3C, 4A (all four occurrences), 4B (all three occurrences), 4C (all three occurrences), 5A, 5B, 5C, 6B, 6C (all three occurrences), 7 (both occurrences), "PAYEE" should be -- PAYER --.

<u>Column 1,</u>
Line 4, "payee" should be -- Payer --;

<u>Column 3,</u>
Lines 3, 6, 7, 8, 10, 12, 13, 21, 26, 28, 30, 31, 32, 33, 34, 40, 46 and 65, "payee" should be -- Payer --;

<u>Column 4,</u>
Lines 9, 13, 16, 21, 24, 27, 39, 47, 50 (both occurrences), 56, 62 (both occurrences), 65 and 66, "payee" should be -- Payer --;

<u>Column 5,</u>
Lines 4 (both occurrences), 6, 13, 15, 18, 21, 30, 32, 34, 38, 39, 51 and 53, "payee" should be -- Payer --;

<u>Column 6,</u>
Lines 3, 4, 5, 10, 13, 16, 34, 42, 44, 51, 54, 58, 62 and 63, "payee" should be -- Payer --;

<u>Column 7,</u>
Lines 1, 3, 7, 12, 18, 24, 29, 31, 32, 36, 42, 45, 53, 54, 57, 59, 61 and 64, "payee" should be -- Payer --;

<u>Column 8,</u>
Lines 3, 5, 7, 17, 20, 24, 29, 33, 36, 40, 53, 57, 60, 63, 64 and 66, "payee" should be -- Payer --;

<u>Column 9,</u>
Lines 1, 3, 5, 13, 16, 21, 34, 36, 42, 44, 48, 56, 62 and 66, "payee" should be -- Payer --;

UNITED STATES PATENT AND TRADEMARK OFFICE
CERTIFICATE OF CORRECTION

PATENT NO. : 6,853,977 B1
DATED : February 8, 2005
INVENTOR(S) : Yushi Niwa

It is certified that error appears in the above-identified patent and that said Letters Patent is hereby corrected as shown below:

Column 10,
Lines 2, 4, 5, 8, 11, 12, 14, 22, 29, 31, 34, 40, 42, 47, 51, 53, 57, 63 and 64, "payee" should be -- Payer --;

Column 11,
Lines 3, 14, 15, 18, 21, 24, 28, 31, 33 (both occurrences), 36, 39, 43, 51, 52, 53 (both occurrences) and 56, "payee" should be -- Payer --;

Column 12,
Lines 1, 3, 9, 11, 12, 15, 16, 20, 25, 26, 29, 31, 32, 35 (both occurrences), 38, 41 and 53, "payee" should be -- Payer --.

Signed and Sealed this

Second Day of May, 2006

JON W. DUDAS
*Director of the United States Patent and Trademark Office*